(12) United States Patent
Chen

(10) Patent No.: US 11,396,345 B1
(45) Date of Patent: Jul. 26, 2022

(54) REMOVABLE TOE CLIP FOR BICYCLE PEDAL

(71) Applicant: Yong-Fu Chen, Taichung (TW)

(72) Inventor: Yong-Fu Chen, Taichung (TW)

(73) Assignee: SCADA INTERNATIONAL CO., LTD., Taichung (TW)

( * ) Notice: Subject to any disclaimer, the term of this patent is extended or adjusted under 35 U.S.C. 154(b) by 36 days.

(21) Appl. No.: 17/339,910

(22) Filed: Jun. 4, 2021

(51) Int. Cl.
*B62M 3/08* (2006.01)

(52) U.S. Cl.
CPC ............ *B62M 3/086* (2013.01); *B62M 3/083* (2013.01)

(58) Field of Classification Search
CPC ...................................................... B62M 3/083
See application file for complete search history.

(56) References Cited

U.S. PATENT DOCUMENTS

| 6,035,743 | A | * | 3/2000 | Gapinski | B62M 3/083 36/131 |
| 2009/0235778 | A1 | * | 9/2009 | Chen | B62M 3/086 74/594.6 |
| 2019/0054977 | A1 | * | 2/2019 | Golesh | B62M 3/086 |

* cited by examiner

*Primary Examiner* — Vicky A Johnson

(57) ABSTRACT

A toe clip includes a seat body, a toe clip and an adapter. The seat body has a top side, a bottom side and adapter fixing holes. The top side has a toe clip connecting portion and toe clip fixing holes. The bottom side has an adapter connecting portion. The toe clip includes a clip body and a washer. The clip body includes a mount plate and a clip. The mount plate has long holes. The washer has through holes. The through holes, the long holes and the toe clip fixing holes are separately passed by screws to fasten the toe clip onto the seat body. The adapter is used for connecting the seat body to the pedal and is formed with passing holes. The passing holes and the adapter fixing holes are separately passed by screws to fasten the adapter to the seat body.

7 Claims, 6 Drawing Sheets

REMOVABLE TOE CLIP FOR BICYCLE PEDAL

BACKGROUND

Technical Field

The invention relates to bicycles, particularly to toe clips of bicycle pedals.

Related Art

The pedals used by general indoor cycling bikes are of a two-use type, namely, a toe clip on a side and a cleat fastener on the other side. When a user wears regular sneakers, he or she can use the toe clips to fix his or her feet. When a user wears cycling shoes with cleats, he or she can lock onto the pedals with the cleats. However, a cleat must match with an exclusive cleat fastener. Different systems cannot be compatible. There are two main brand groups of clipless pedals, SHIMANO® and LOOK®. And each brand further includes at least two types, a type for mountain bikes and a type for road bikes. The abovementioned two-use pedal only can use the type for mountain bikes because of the limitations of area and contour of the pedal.

A road bike or mountain bike for outdoor cycling is usually equipped with a single pair of clipless pedals or non-clipless pedals without two uses. When a bike is equipped with clipless pedals, a user must wear exclusive cycling shoes but cannot wear regular sneakers. On the contrary, when a bike is equipped with non-clipless pedals, a user must wear regular sneakers. On the other hand, wearing cycling shoes is disadvantageous to walking on the ground because the cleat protrudes from the sole. If a user needs to walk for a longer distance, he or she must change to regular sneakers. It is very inconvenient. Also, if a user wears regular sneakers and wants to ride a bike equipped with clipless pedals, he or she must change shoes. It is inconvenient, too.

SUMMARY

An object of the invention is to provide a removable toe clip for a bicycle pedal, which can fasten a toe clip onto a pedal with different types by clipping or screwing, so that a user wearing regular sneakers can ride a bike or an indoor cycling bike equipped with clipless pedals.

To accomplish the above object, the removable toe clip for a bicycle pedal of the invention includes a seat body, a toe clip and an adapter. The seat body has a top side, a bottom side and adapter fixing holes. The top side is formed with a toe clip connecting portion and toe clip fixing holes. The bottom side is formed with an adapter connecting portion. The toe clip includes a clip body and a washer. The clip body includes a mount plate and a clip extending from the mount plate. The mount plate is formed with long holes. The washer is formed with through holes corresponding to the long holes. The washer is placed on the mount plate. Through holes, the long holes and the toe clip fixing holes are separately passed by screws to fasten the toe clip onto the seat body. The adapter is used for connecting the seat body to the pedal and is formed with passing holes corresponding to the adapter fixing holes. The passing holes and the adapter fixing holes are separately passed by screws to fasten the adapter to the seat body.

DETAILED DESCRIPTION

Figure 1:
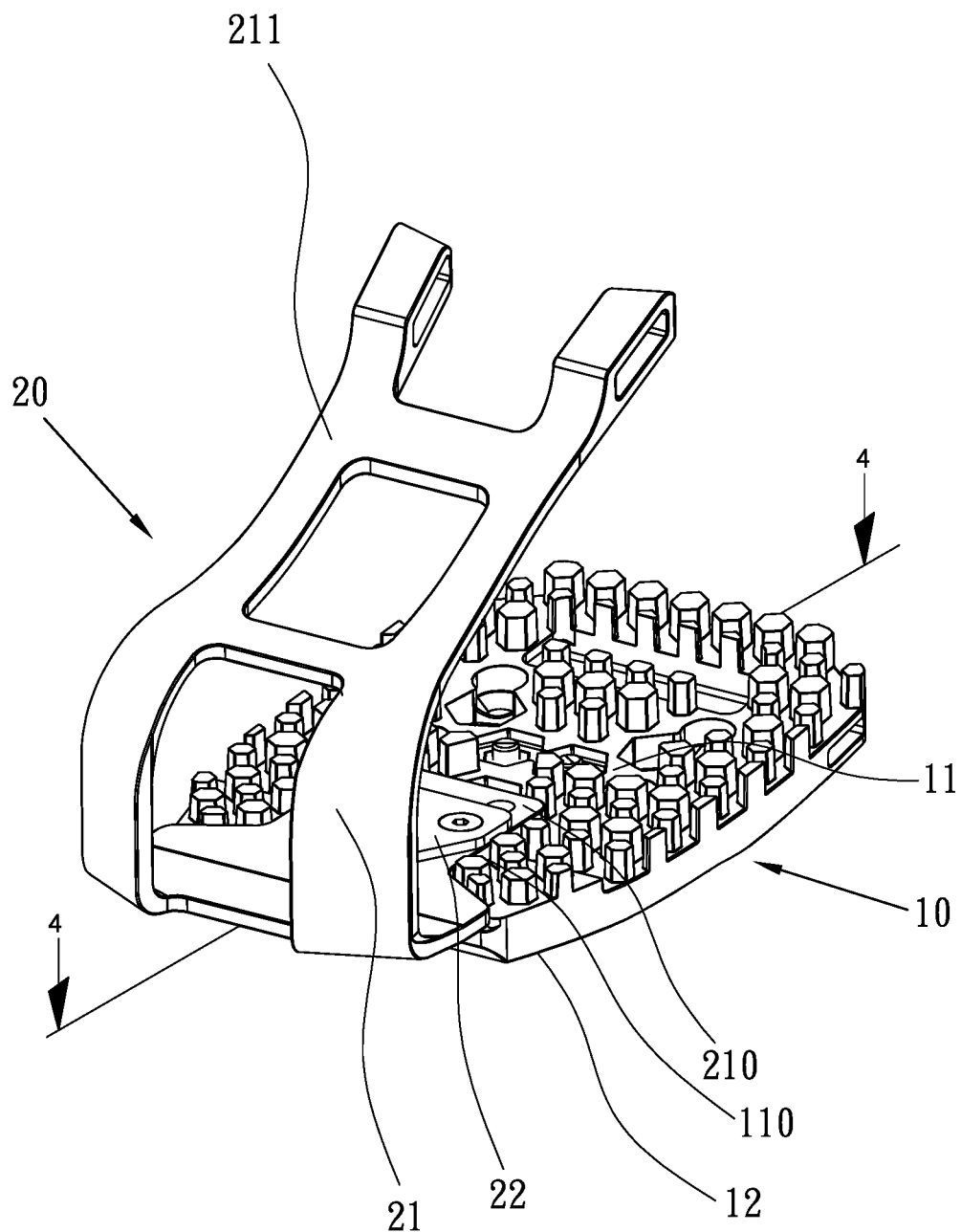
FIG. 1 is an assembled view of the invention.
Figure 2:
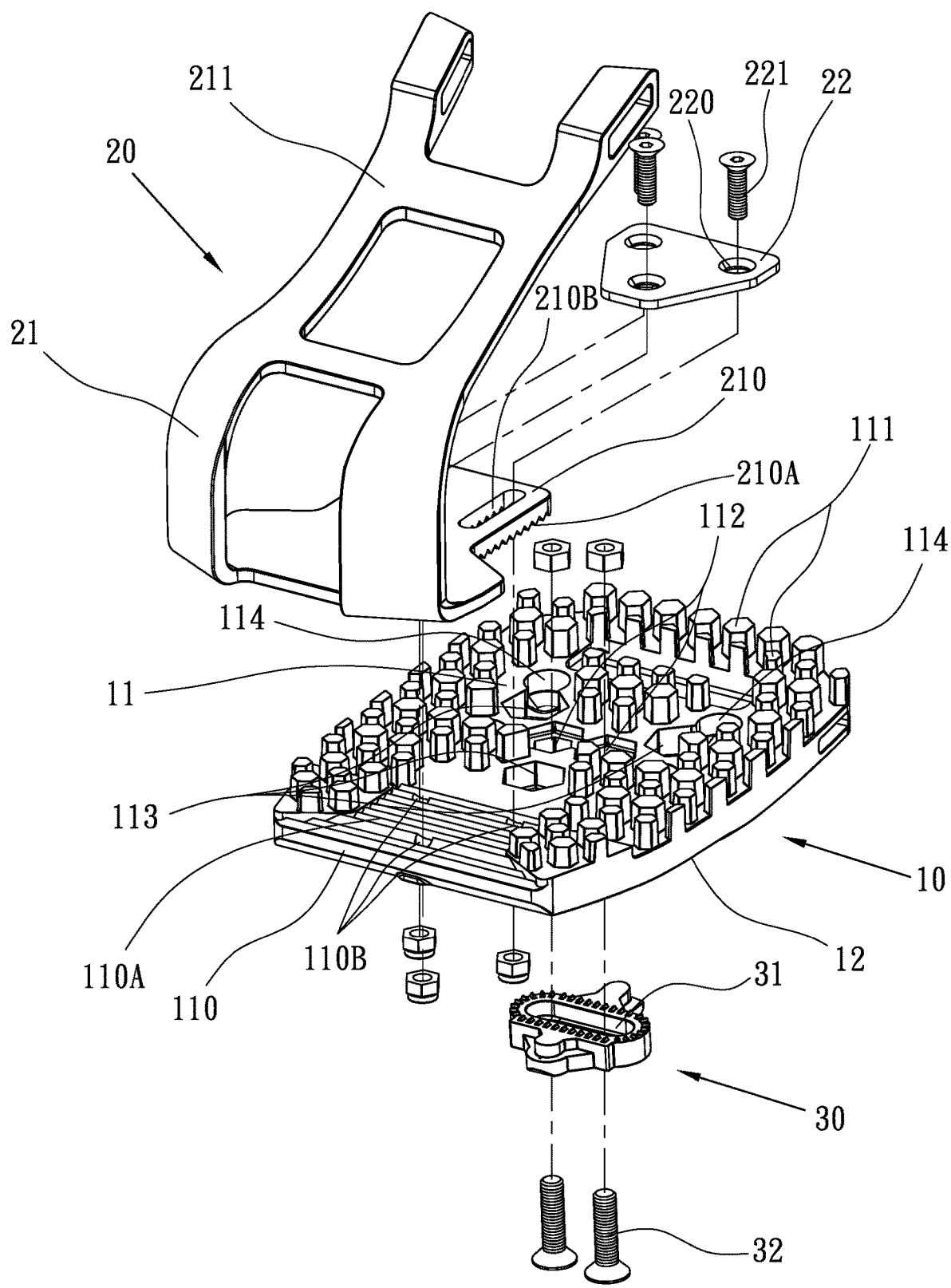
FIGS. 2 and 3 are two exploded views of the invention associating with a cleat for a mountain bike.
Figure 3:
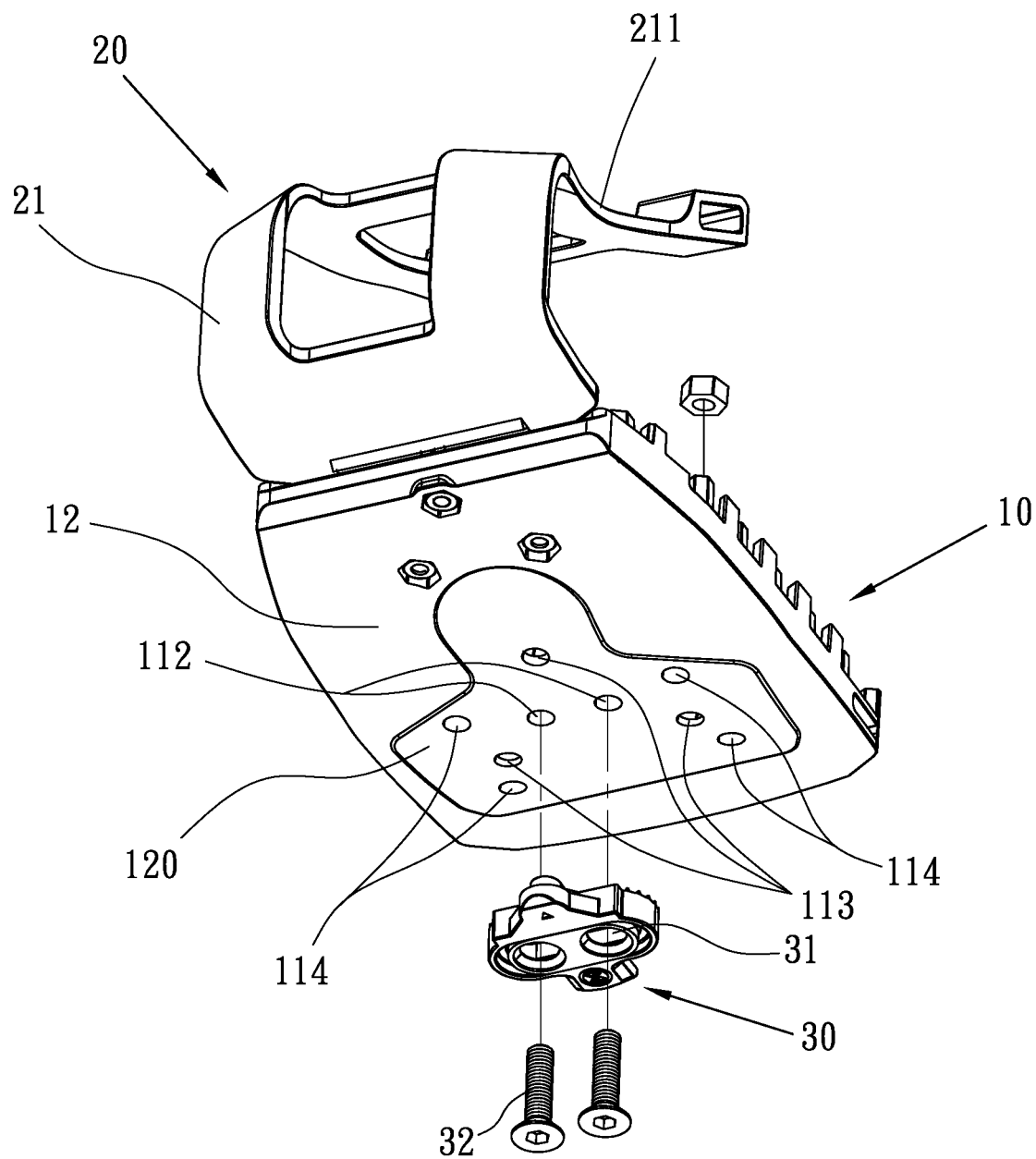
Figure 4:
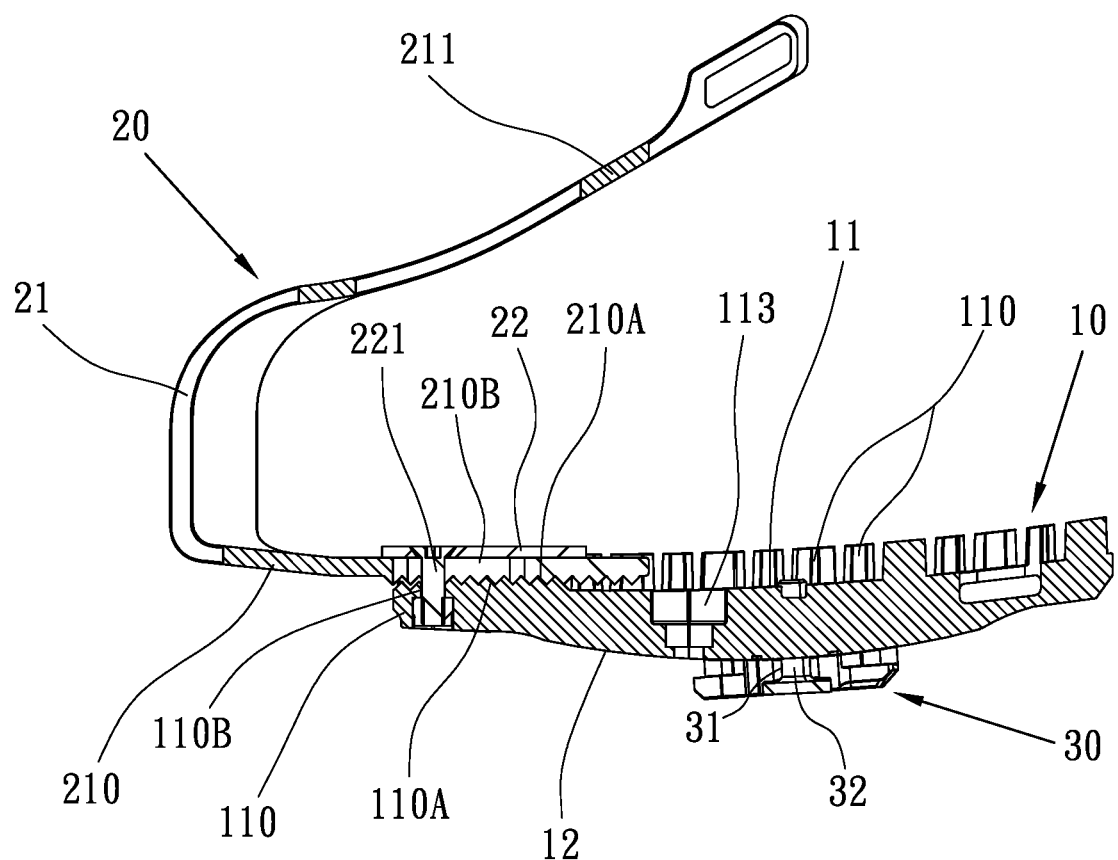
FIG. 4 is a cross-sectional view along line 4-4 in FIG. 1.

The technical contents of this disclosure will become apparent with the detailed description of embodiments accompanied with the illustration of related drawings as follows. It is intended that the embodiments and drawings disclosed herein are to be considered illustrative rather than restrictive.

In the following description, the directional terms, such as front, rear, top and bottom, are based upon a bicycle which is upright on the ground. The term "front" means a direction toward the front wheel, the "rear" means a direction toward the rear wheel, the term "top" means a direction toward the sky and the term "bottom" means a direction toward the ground.

Please refer to FIGS. 1-4. The removable toe clip for a bicycle pedal of the invention includes a seat body 10, a toe clip 20 and an adapter 30. The toe clip 20 and the adapter 30 are separately removably fixed on a top side 11 and a bottom side 12 of the seat body 10.

The front of the top side 11 of the seat body 10 is formed with a toe clip connecting portion 110 for connecting the toe clip 20. A surface of the toe clip connecting 110 is formed with a first toothed surface 110A. The toe clip connecting portion 110 is formed with toe clip fixing holes 110B for fixing the toe clip 20 to the toe clip connecting portion 110 of the seat body 10. The number of the toe clip fixing holes 110B is at least two, three are shown in the figures and may be arranged into an equilateral triangle or an isosceles triangle. Non-slip protrusions 111 are provided on the middle and the rear of the top side 11 to form a non-slip surface. The bottom side 12 of the seat body 10 is formed with an adapter connecting portion 120. Multiple groups of adapter fixing holes are formed in the adapter connecting portion 120. The adapter fixing holes include two first adapter fixing holes 112, three second adapter fixing holes 113 and four third adapter fixing holes 114 for fixing three different types of adapters 30. The two first adapter fixing holes 112 are arranged into a straight line, the three second adapter fixing holes 113 are arranged into an equilateral triangle or an isosceles triangle, and the four third adapter fixing holes 114 are arranged into a rectangle.

The toe clip 20 includes a clip body 21 and a washer 22. The clip body 21 includes a mount plate 210 and a clip 211 extending from the mount plate 210. The bottom of the mount plate 210 is formed with a second toothed surface 210A. The second toothed surface 210A corresponds to and engages with the first toothed surface 110A to prevent slide. The mount plate 210 is formed with long holes 210B corresponding to the toe clip fixing holes 110B. Each long hole 210B is longitudinally arranged from the front to the rear. The washer 22 is formed with through holes 220 corresponding to the toe clip fixing holes 110B. The washer 22 is placed on the mount plate 210. The through holes 220, the long holes 210B and the toe clip fixing holes 110B are separately passed by screws 221 to fasten the toe clip 20 onto the seat body 10. The long holes 210B allow the first and second toothed surfaces 110A, 210A to make a longitudinally relative position adjustment. That is, the position of the toe clip 20 relative to the seat body 10 may be longitudinally adjusted in the length range of the long hole 210B.

The adapter 30 may have three different types to correspond to three different types of pedals. The adapter 30 shown in FIGS. 1-4 is a cleat for a clipless pedal of a mountain bike. The adapter 30 has two passing holes 31 corresponding to the two adapter fixing holes 112. The passing holes 31 and the adapter fixing holes 112 are separately passed by screws 32 to fix the adapter 30 to the seat body 10. The adapter 30 may be used for engaging with a mountain-bike-type clipless pedal so that the seat body 10 and the toe clip 20 can be fixed on the pedal by clipping in.

Figure 5:
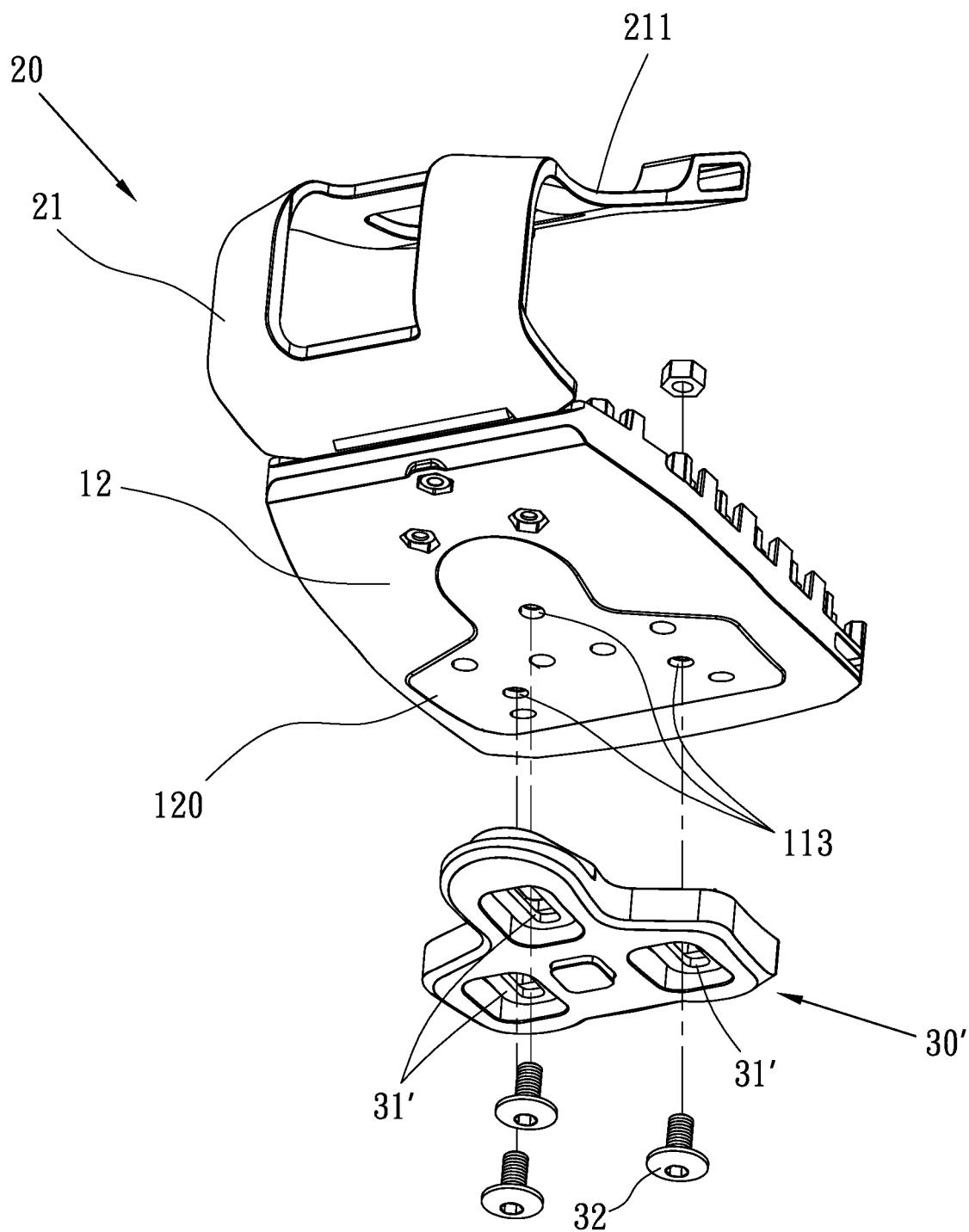
FIG. 5 is a schematic view of the invention associating with a cleat for a road bike.

The adapter 30' shown in FIG. 5 is a cleat for a clipless pedal of a road bike. The adapter 30' has three passing holes 31' corresponding to the three adapter fixing holes 113. The passing holes 31' and the adapter fixing holes 113 are separately passed by screws 32 to fix the adapter 30' to the seat body 10. The adapter 30' may be used for engaging with a road-bike-type clipless pedal so that the seat body 10 and the toe clip 20 can be fixed on the pedal by clipping in.

Figure 6:
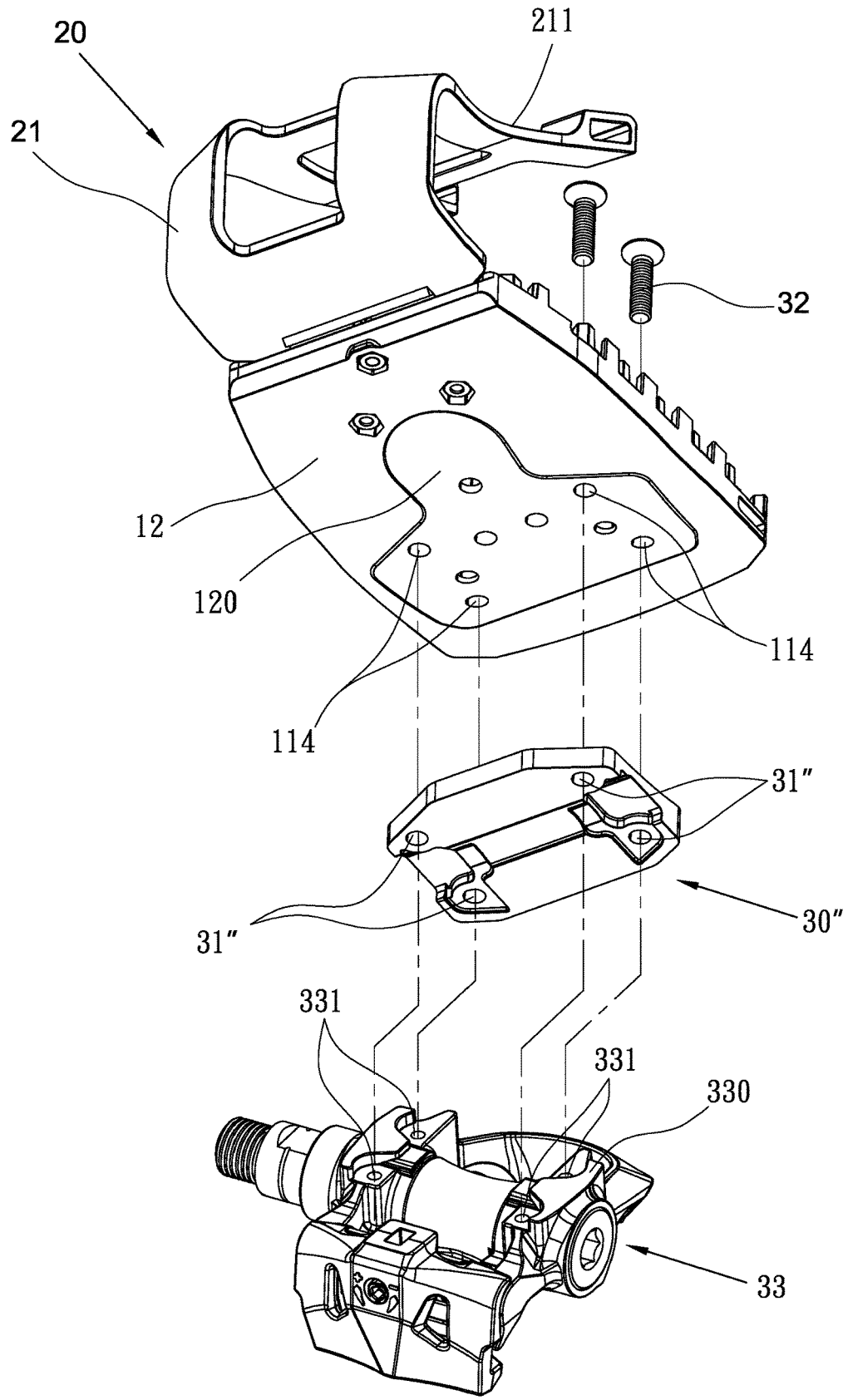
FIG. 6 is a schematic view of the invention associating with a seat plate suitable for a non-clipping surface of a clipless pedal of a road bike.

The adapter 30" shown in FIG. 6 is a seat plate for a non-clipping side of a clipless pedal of a road bike. The adapter 30" has four passing holes 31" corresponding to the four adapter fixing holes 114. The passing holes 31" and the adapter fixing holes 114 are separately passed by screws 32 to fix the adapter 30" to the seat body 10. The adapter 30" may be used for being fixed to a non-clipping side 330 of a road-bike-type clipless pedal 33 so that the seat body 10 and the toe clip 20 can be fixed on the pedal 33 by screwing. The non-clipping side 330 means the opposite side of the clipping side of the pedal which is used to engage with a cleat. In a normal road-bike-type clipless pedal, the non-clipping side 330 is useless, but some pedals provide four holes 331 to fasten a seat plate or modularized cycling shoes.

While this disclosure has been described by means of specific embodiments, numerous modifications and variations could be made thereto by those skilled in the art without departing from the scope and spirit of this disclosure set forth in the claims.

What is claimed is:

1. A removable toe clip for a bicycle pedal, comprising:
a seat body, having a top side, a bottom side and adapter fixing holes, the top side being formed with a toe clip connecting portion and toe clip fixing holes, and the bottom side being formed with an adapter connecting portion;
a toe clip, comprising a clip body and a washer, the clip body comprising a mount plate and a clip extending from the mount plate, the mount plate being formed with long holes, the washer being formed with through holes corresponding to the long holes, the washer being placed on the mount plate, and the through holes, the long holes and the toe clip fixing holes being separately passed by screws to fasten the toe clip onto the seat body; and
an adapter, used for connecting the seat body to the pedal, being formed with passing holes corresponding to the adapter fixing holes, and the passing holes and the adapter fixing holes being separately passed by screws to fasten the adapter to the seat body;
wherein the toe clip connecting portion is formed with a first toothed surface, and a bottom of the mount plate is formed with a second toothed surface corresponding to the first toothed surface.

2. The removable toe clip of claim 1, wherein the top side of the seat body is formed with non-slip protrusions.

3. A removable toe clip for a bicycle pedal, comprising:
a seat body, having a top side, a bottom side and adapter fixing holes, the top side being formed with a toe clip connecting portion and toe clip fixing holes, and the bottom side being formed with an adapter connecting portion;
a toe clip, comprising a clip body and a washer, the clip body comprising a mount plate and a clip extending from the mount plate, the mount plate being formed with long holes, the washer being formed with through holes corresponding to the long holes, the washer being placed on the mount plate, and the through holes, the long holes and the toe clip fixing holes being separately passed by screws to fasten the toe clip onto the seat body; and
an adapter, used for connecting the seat body to the pedal, being formed with passing holes corresponding to the adapter fixing holes, and the passing holes and the adapter fixing holes being separately passed by screws to fasten the adapter to the seat body;
wherein the toe clip fixing holes are three in number and arranged into a triangular shape.

4. A removable toe clip for a bicycle pedal, comprising:
a seat body, having a top side, a bottom side and adapter fixing holes, the top side being formed with a toe clip connecting portion and toe clip fixing holes, and the bottom side being formed with an adapter connecting portion;
a toe clip, comprising a clip body and a washer, the clip body comprising a mount plate and a clip extending from the mount plate, the mount plate being formed with long holes, the washer being formed with through holes corresponding to the long holes, the washer being placed on the mount plate, and the through holes, the long holes and the toe clip fixing holes being separately passed by screws to fasten the toe clip onto the seat body; and
an adapter, used for connecting the seat body to the pedal, being formed with passing holes corresponding to the adapter fixing holes, and the passing holes and the adapter fixing holes being separately passed by screws to fasten the adapter to the seat body;
wherein the adapter fixing holes comprise two first adapter fixing holes, three second adapter fixing holes and four third adapter fixing holes.

5. The removable toe clip of claim 4, wherein the adapter is a cleat corresponding to a mountain-bike clipless pedal and is fastened to the first adapter fixing holes by screws.

6. The removable toe clip of claim 4, wherein the adapter is a cleat corresponding to a road-bike clipless pedal and is fastened to the second adapter fixing holes by screws.

7. The removable toe clip of claim 4, wherein the adapter is a cleat corresponding to a non-clipping side of a road-bike-type clipless pedal and is fastened to the three adapter fixing holes by screws.

* * * * *